United States Patent [19]

Kensrue et al.

[11] 4,131,783

[45] Dec. 26, 1978

[54] WELDING APPARATUS

[76] Inventors: Milo M. Kensrue, 56 Linda Isle, Newport Beach, Calif. 92660; Donald L. Martin, 12132 Woodlawn Ave., Santa Ana, Calif. 92705

[21] Appl. No.: 763,812

[22] Filed: Jan. 31, 1977

[51] Int. Cl.² .............................................. B23K 9/12
[52] U.S. Cl. ........................... 219/124.31; 219/125.12; 219/126; 228/27; 228/45
[58] Field of Search ...................... 219/60 R, 60 A, 76, 219/124, 125 R, 125 PL, 126, 131 F, 124.31, 124.1, 125.12; 228/27, 28, 32, 45

[56] References Cited

U.S. PATENT DOCUMENTS

| | | | |
|---|---|---|---|
| 3,671,712 | 6/1972 | Fisher | 219/125 R |
| 3,681,564 | 8/1972 | Hiyama et al. | 219/125 R |
| 3,742,184 | 6/1973 | Arikawa et al. | 219/126 |
| 3,764,777 | 10/1973 | Sakabe et al. | 219/125 R |
| 3,779,444 | 12/1973 | Kensrue | 219/125 R X |
| 3,843,866 | 10/1974 | Kensrue | 219/131 F X |
| 3,924,094 | 12/1975 | Hansen et al. | 219/131 F X |

*Primary Examiner*—J. V. Truhe
*Assistant Examiner*—Clifford C. Shaw
*Attorney, Agent, or Firm*—Whann & McManigal

[57] ABSTRACT

Welding apparatus in which a self-propelled wheeled carriage releasably supports a welding gun or torch of the hand-held type having a welding tip and control for controlling feed of a welding wire to the welding tip, wherein the carriage is guided along a joint to be welded at a predetermined proper welding speed, the welding gun being adjustably supported on a pivotally mounted cradle which is power-actuated to provide controlled oscillations of the welding gun and associated tip transversely of the joint at a rate of speed proportional to the propelled speed of the carriage, the amplitude of the oscillations being selectively adjustable between zero and a predetermined maximum. Interchangeable driving wheel units provide for use in the welding of planar disposed surfaces and angularly disposed surfaces. In one form of the invention, provision is made for applying a force against the carriage in a direction perpendicular to the joint axis, and also in the case of vertical weld joints for applying a weight counterbalancing force to the carriage.

23 Claims, 12 Drawing Figures

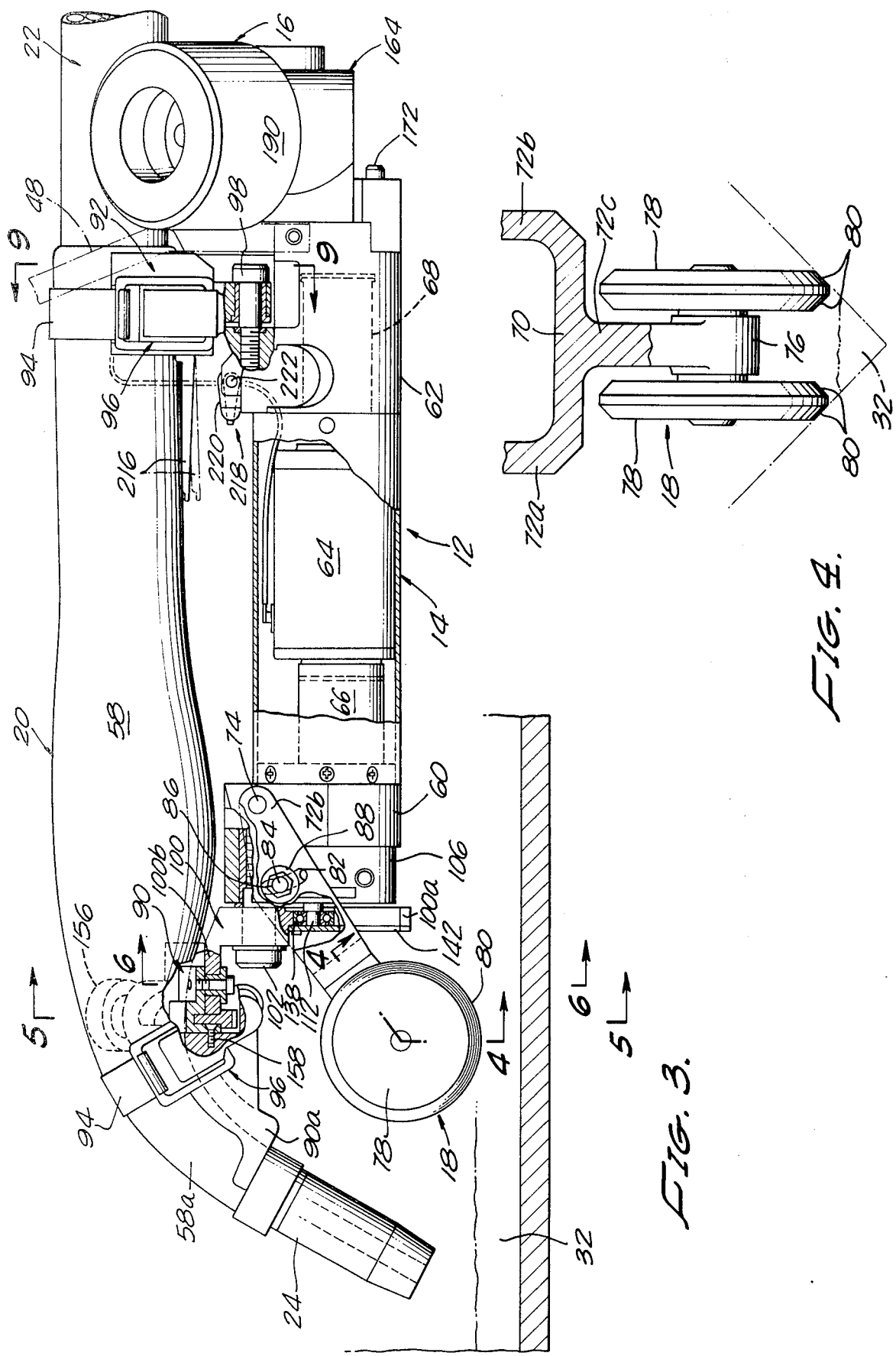

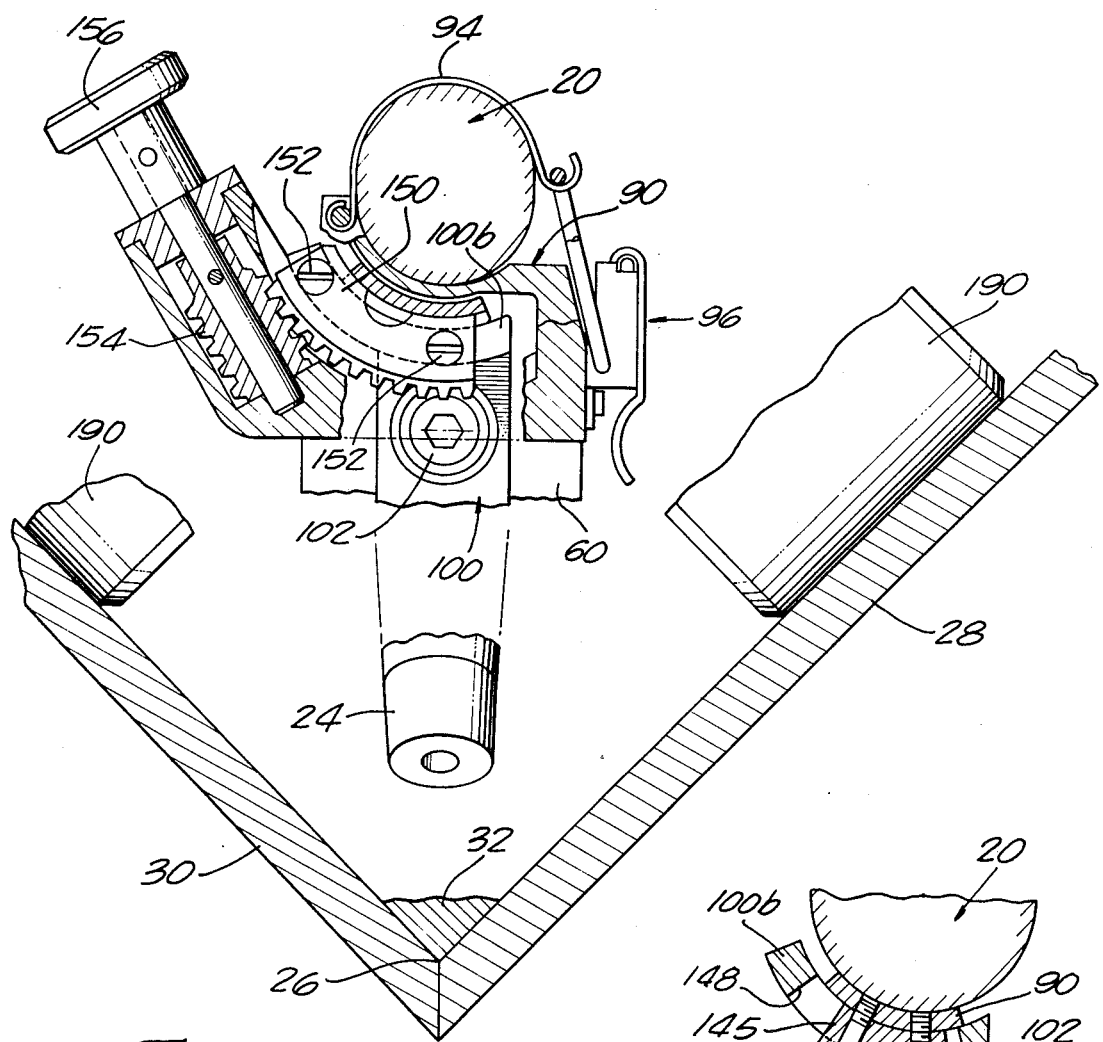
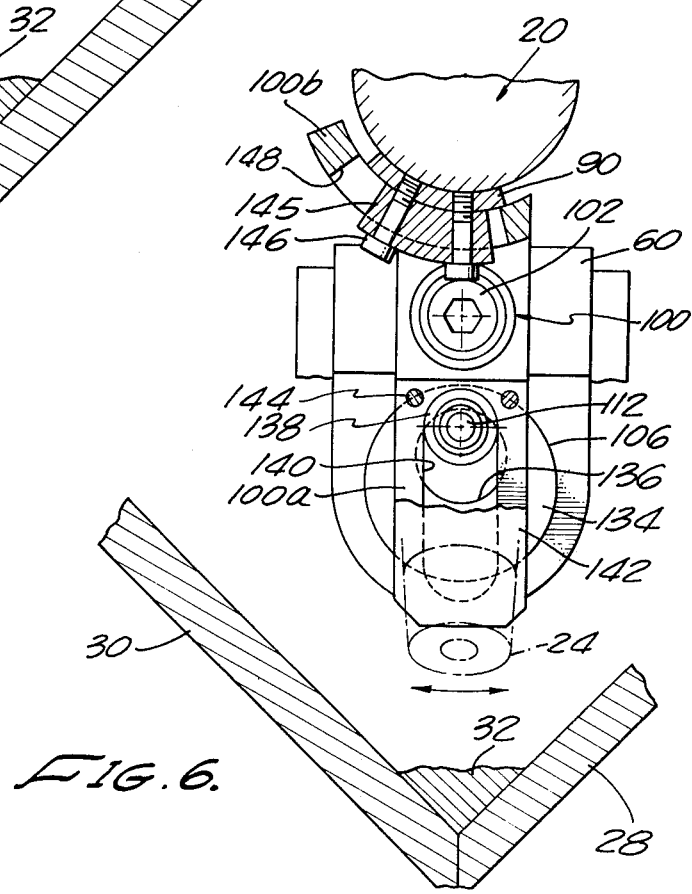
FIG. 5.
FIG. 6.

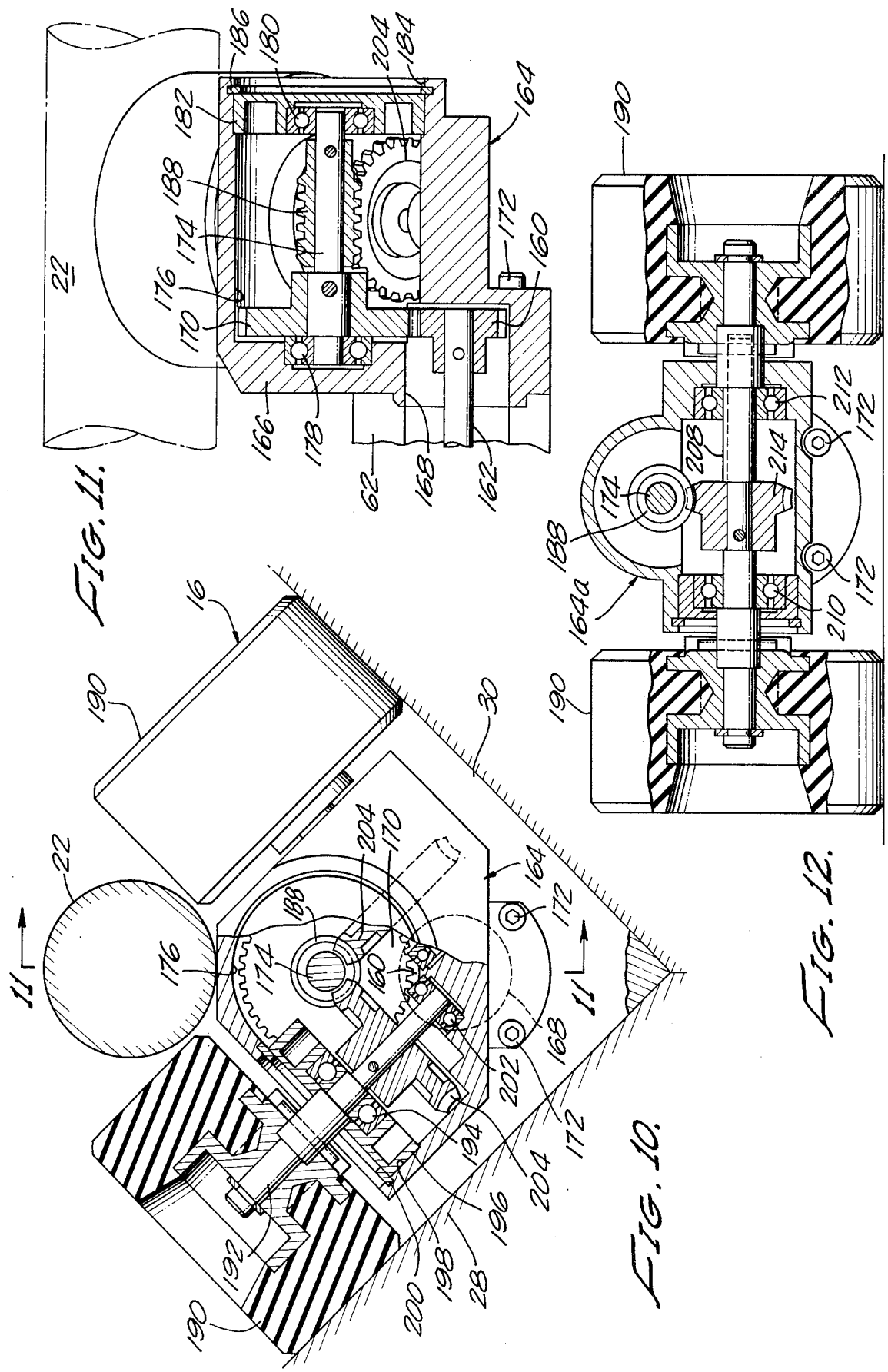

WELDING APPARATUS

BACKGROUND OF THE INVENTION

The present invention relates generally to the field of welding metallic materials.

The advantages attending the use of automatic fillet and butt welding apparatus, wherein the welding tip of a welding torch is adjustably oscillatable in transverse passes across the weld axis, while being propelled axially along the weld axis, has heretofore been generally known and appreciated from U.S. Pat. No. 3,843,866. Such apparatus, however, has in the main been of quite large size and relatively expensive, and such known apparatus is indeed too bulky and expensive to justify its extensive use.

There has therefore been a growing and present need for an economical, small sized welding apparatus, particularly of the type which may be hand-operated, and which could be depended upon to produce welds comparable to those produced by the larger apparatus as known from the aforementioned patent, and which preferably would permit the use, without modifying changes, of a standard available hand-held torch, and by the use of which an essentially unskilled person could repeatedly produce superior long and continuous welds during relatively long operating periods.

Attempts to produce such a hand-operated welding apparatus have heretofore been only moderately successful. For example, it has been known generally from U.S. Pat. No. 3,201,561 to provide a hand-operated welding gun or torch which is supported upon a power propelled wheeled carriage that is guided along the weld joint. The apparatus as disclosed in this patent is designed for and limited to movement of the welding tip axially along the weld. It is therefore only possible in this case to make an axially extending bead weld of limited width. It will therefore be appreciated that the apparatus as exemplified by this patent is not adapted to move the tip in a manner to produce the desired transverse oscillations of the tip so as to produce desirable welds of increased and greater width than are possible in the bead type of weld, while propelling the apparatus along the weld joint.

Briefly, according to the present invention, the hand-held welding apparatus utilizes a standard hand-held welding gun or torch which is releasably supported in a uniquely arranged pivotally mounted cradle on the carriage structure, the torch being supported in a position such that the welding tip will occupy a proper welding position with respect to the weld joint. Power means are utilized to propel the carriage along the weld joint and to simultaneously synchronously rock the cradle in a manner to oscillate the tip of the welding torch in transverse passes of the weld joint. In a preferred embodiment, a single power source is utilized and connected, through speed changers having predetermined ratios, respectively with the driving connections for the propelling means and the cradle-rocking means, whereby the speed of oscillation of the welding tip of the torch in relation to the propelled speed of the carriage may be maintained at a predetermined ratio. Provision is also made in the driving connection for the cradle for adjusting the extent of cradle rocking, and the concomitant extent of oscillation of the welding tip of the torch between the range limits of zero and a predetermined maximum value.

SUMMARY OF THE INVENTION

The present invention relates generally to welding apparatus, and is more particularly concerned with the provision of small compact welding apparatus of the hand-held type which may be utilized by a substantially unskilled operator for semi-automatic and automatic welding operations.

One object of the herein described invention is to provide a light weight, compact welding apparatus of improved and unique construction, in which a self-propelled carriage mounts an unmodified standard welding torch of the hand-held type.

A further object resides in the provision of such a welding apparatus in which the welding torch is adjustably supported in a swingably mounted cradle that can be rocked at a rate of speed proportional to the propelled speed of the carriage to provide controlled oscillatory movements of the torch welding tip transversely of the weld joint axis, and in which the amplitude of the oscillations of the torch tip may be adjusted between zero and a predetermined maximum value.

A further object is to provide welding apparatus according to the foregoing object, in which a common power source is utilized for propelling the apparatus and for rocking the torch supporting cradle.

Another object is to provide in such welding apparatus, unique means for simply and effectively adjusting the operative position of the welding torch tip in relation to the weld joint.

Still another object is to provide in a small self-propelled welding apparatus, a unique driving and guiding wheel arrangement which permits the selective use of a plurality of interchangeable driving wheel unit assemblies to accommodate the apparatus for the welding of a joint between flat surfaces in planar relation or in angularly positioned relation.

It is also an object to provide a hand-held self-propelled welding apparatus having unique means for applying traction pressure, and/or weight counterbalancing forces, when welding substantially vertically extending joints.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 3 is a side elevational view, with portions cut away, showing details of construction and operative relationship of the related components;

FIG. 4 is an enlarged fragmentary sectional view showing details of the guide wheel assembly, and its relationship to the weld joint, taken substantially on line 4—4 of FIG. 3;

FIG. 5 is an enlarged fragmentary sectional view taken substantially on line 5—5 of FIG. 3, showing the mechanism for laterally adjusting the torch tip in relation to the weld seam;

FIG. 6 is a similar sectional view taken substantially on line 6—6 of FIG. 3 to show details of the cradle oscillating mechanism;

FIG. 10 is an enlarged rear-end elevational view of the apparatus shown in FIG. 3, with portions in section to show the driving mechanism of the driving wheels;

FIG. 11 is an enlarged fragmentary sectional view taken substantially on line 11—11 of FIG. 10; and FIG. 12 is a sectional view similar to that of FIG. 10, showing a modified driving mechanism.

DESCRIPTION OF THE DISCLOSED EMBODIMENTS

Figure 1:
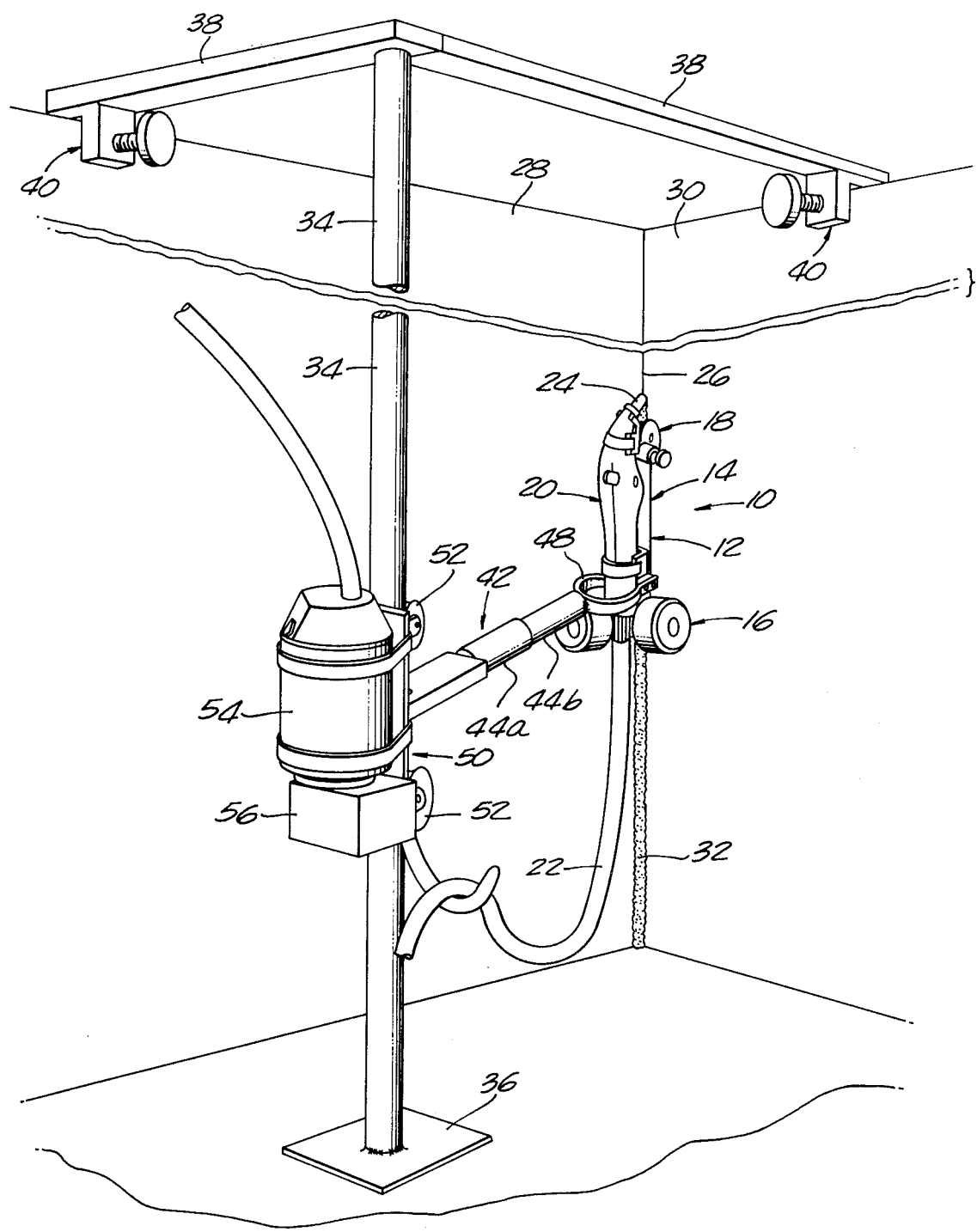
FIG. 1 is a perspective view illustrating one manner of utilizing welding equipment embodying the features of the present invention for automatically welding a vertical joint.

Referring more specifically to the drawings, the apparatus of the present invention is illustrated in FIG. 1 as being embodied in an arrangement which is particularly adapted for automatic operation in the production of substantially vertically extending welded joints. It is to be understood, however, that the apparatus is not limited to such use, but may with equal facility be utilized for the production of horizontally extending joints.

Further, with reference to FIG. 1, the welding apparatus of the present invention is shown, as generally indicated at 10, as comprising a wheel carriage structure 12 in which a chassis frame 14 has a unified driving wheel assembly 16 at one end, and a guide wheel assembly 18 at the other end. A standard available welding torch 20 of the hand-held type is releasably mounted on and carried by the wheeled carriage, one end of the torch being connected with the conventional flexible supply cables 22 while the other end of the torch is operatably positioned with its welding tip 24 adjacent the weld joint 26. For illustrative purposes, the weld joint is in this case shown as being the corner angle between a pair of workpieces which comprise upright wall panels 28 and 30 in right-angled relation and which are to be welded at the angle by means of a fillet type weld as generally indicated by the numeral 32. In the case of a butt weld, the plate members would be positioned coplanar and have their adjacent edges beveled to provide surfaces at the weld joint which are in appropriate angular relation.

For most welding operations, the apparatus will be hand held by simply grasping the body of the welding torch 20 and manually positioning and holding it on the weld beam. As thus positioned, the apparatus will be guided along the seam by the guide wheel assembly 18 and propelled by the driving wheel assembly 16. Thus, an unskilled operator is able to make an excellent weld.

There are other times during which it may be desirable in the making of horizontal or vertically extending welds to operate the apparatus in an automatic manner, and in which an operator will not manually hold the welding apparatus. In this case, additional means are provided for mechanically applying traction pressure to the welding apparatus, and also for counterbalancing the weight forces, particularly in the case of vertical welds. For this purpose, a guide member 34, shown in this instance as comprising an elongate cylindrical pole, is supported at its bottom end by a base pad 36. The uppermost end of the guide member is anchored by a pair of arm members 38, each of which is fitted at its outermost end with anchor means 40 for attachment to the respective wall panels. The anchor means may vary and may be magnetic, or, as shown, may comprise a screw clamp arrangement.

Figure 2:
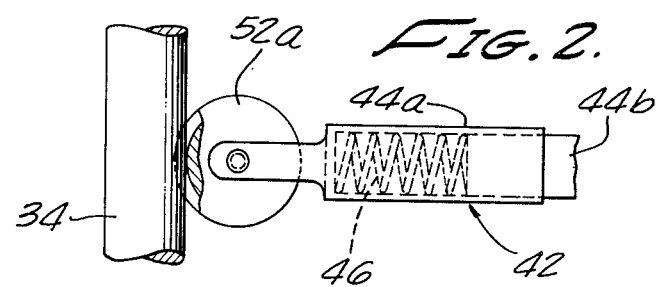
FIG. 2 is a fragmentary detail view illustrating a modified structure for applying traction pressure to the apparatus as shown in FIG. 1.

Guide member 34 should be aligned in parallel relation to the intended weld joint. Traction forces are applied between the guide manner 34 and the welding apparatus by means of a strut 42 having telescoping sections 44a and 44b which are urged towards an extended position by a compression coiled spring 46 as shown in FIG. 2. The outer end of section 44b is rigidly connected to the chassis frame 14 by a suitable straddle yoke 48, and the outer end of the section 44a is rigidly connected with a carriage structure 50 supported for movement along the guide member 34 by means of appropriate guide rollers 52.

With the above described arrangement, it will be apparent that an upwardly acting force applied to the strut 42 will tend to counterbalance downwardly acting weight forces of the welding apparatus, and that the driving mechanism of the welding apparatus will only be required to provide the power for moving the apparatus along the weld seam. It will be appreciated that springs or weights might be used for producing the counterbalancing forces. However, in the disclosed embodiment, a torque motor 54 is connected through a gear box 56 with at least one of the guide rollers 52; so that, when the motor is energized, a constantly acting force will be generated in an upward direction on the strut 42.

In the event that the welding apparatus is being utilized for the welding of a generally horizontally disposed weld seam, where the application of traction forces only may be desired, a simplified strut arrangement may be utilized, as shown in FIG. 2. In such case, the outer end of the strut section 44a mounts a roller 52a which is forceably urged against the guide member 34 by the spring 46.

The cooperative relationship of the welding torch 10 and the wheeled carriage structure 12 is best shown in FIG. 3. The welding torch is of available standard construction in which the body portion is in the form of an elongate casing 58 of generally cylindrical configuration so that it may be easily gripped by an operator's hand. The forward end of the casing is reduced to form a curved neck portion 58a having connection with the welding tip 24.

More specifically, the wheeled carriage structure 12 is fabricated to provide a rigid chassis frame 14 which includes a front support block 60 and a rear support block 62, these support blocks being interconnected by a rigid tubular member which forms a housing for a driving motor 64 and connected portions of a front speed reducer 66 and rear speed reducer 68. These speed reducers may vary as to construction, but are preferably of a planetary type and respectively comprise components in driving connections between the driving motor and a rocking mechanism for the welding torch, and the driving mechanism for propelling the apparatus along the weld seam. These mechanisms will subsequently be described in detail.

The driving wheel assembly 16 and guide wheel assembly 18, as shown in FIG. 3, support the welding torch in a welding operative position with respect to the weld seam. As shown in FIG. 4, the guide wheel assembly comprises a yoke supporting bracket 70 with spaced side arms 72a and 72b which extend along opposite sides of the front support block 60, and are respectively pivotally supported on pivots 74 for vertical swinging movement. The yoke supporting bracket is also provided with a central oppositely extending arm 72c which is formed at its outer end with a bearing 76 for supporting a transverse axle which mounts a pair of guide wheels 78 in spaced apart relation so that these wheels will effectively straddle the weld 32, as the carriage is moved therealong. The outer periphery of each guide wheel is preferably beveled on its opposite edge margins as indicated at 80. The vertical swinging movement of the yoke-supporting bracket 70 is adjustable to vary the tip to work distance depending upon the welding parameters. For this purpose, the arm 72b of the bracket 70 is provided with an arcuate slot 82 within which a fixed threaded stud 84 is relatively movable, this stud being provided with a nut 86 and interposed washer 88 which permit securing the yoke bracket in adjusted position.

The welding torch 20 is releasably supported in a cradle structure carried by the chassis frame 14, the torch being supported adjacent its neck portion upon a front cradle shoe structure 90, and adjacent its rear end by a rear cradle shoe structure 92. The welding torch is releasably secured to the cradle shoe structure in each case by means of a hinged flexible retaining strap 94 and an associated tensioning buckle 96 of conventional construction.

Figure 9:
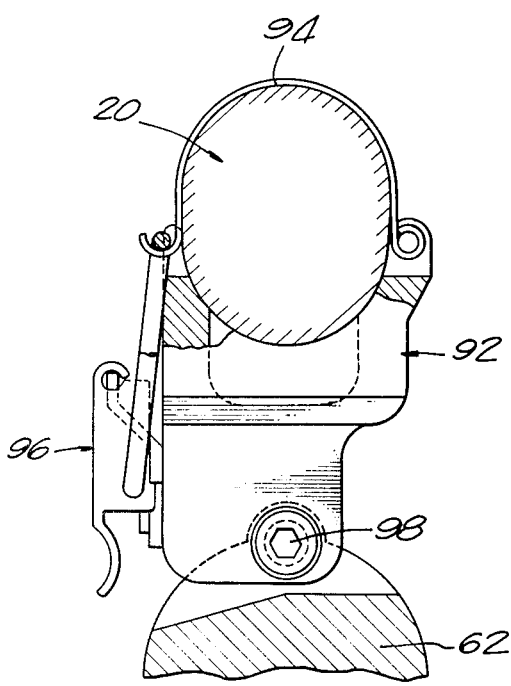
FIG. 9 is an enlarged fragmentary elevational view, as seen substantially from line 9—9 of FIG. 3, to show the mounting of the rear cradle shoe structure.

As shown in FIG. 9, the rear cradle shoe 92 is pivotally supported in an upstanding position for limited rocking movements on a pivot 98 secured to the rear support block.

Figure 7:
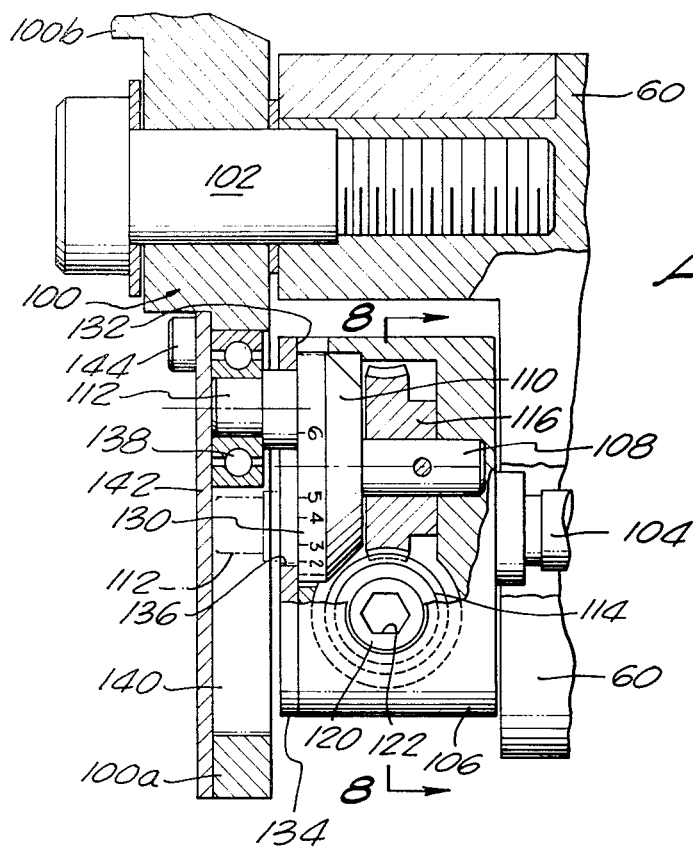
FIG. 7 is an enlarged fragmentary side elevational view with portions shown in section to disclose details of the variable throw driving crank for oscillating the welding torch.
Figure 8:
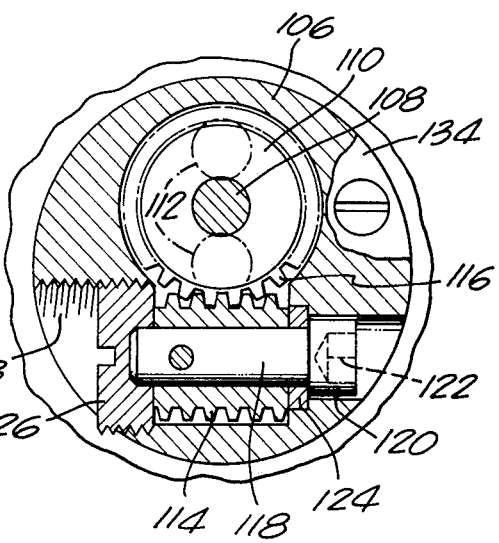
FIG. 8 is an enlarged fragmentary transverse sectional view, taken substantially on line 8—8 of FIG. 7.

As best shown in FIGS. 1 and 7, the front cradle shoe 90 is supported for rocking movement upon an actuator arm 100, this actuator arm being supported intermediate its ends by means of a fixed pivot 102 mounted on the front support block 60. Provision is made through a variable driving connection between the actuator arm 100 and an output shaft 104 of the front speed reducer 66 to variably rock the torch between zero and a predetermined maximum, and whereby the torch tip 24 may have a fixed relation with the weld seam or a predetermined transverse oscillation with respect to the seam. These oscillations may be easily adjusted from 0 to 0.75" (0 to 19 millimeters).

More specifically, as shown in FIGS. 6 and 7, the shaft 104 is fixedly secured to a cylindrical housing 106 within which there is mounted a rotatable shaft 108 having a parallel axis of rotation in offset relation to the axis of rotation of the output shaft 104. The shaft 108 is formed at one end with a generally cylindrical head portion 110 which carries an off-center crank pin 112 having a circular path of rotation such that the crank pin may be adjustably moved between a position of maximum displacement with respect to the axis of shaft 104, and a position of axial alignment with the axis of shaft 104 as shown in phantom lines in FIG. 7.

The position of the crank pin 112 is variably adjustable by means of a rotatably mounted worm 114 having operative meshed relation with a worm gear 116 which is pinned or otherwise secured to the shaft 108. The worm 114 is pinned or otherwise secured to a shaft 118, one end of this shaft having a head portion 120 containing an accessible actuating key socket 122. This end of the shaft is rotatably supported by a ring bearing 124, while the opposite end of this shaft is rotatably supported in a threaded cap bearing 126 having peripheral threaded engagement with an internally threaded bore 128. To aid in the adjustment of the position of the crank pin 112, the periphery of the head portion 110 is provided with appropriate indexing indicia, as indicated at 130, such indicia being visible through a window opening 132 appropriately placed in the cylindrical housing 106. As shown, the side of the housing from which the crank pin 112 projects is provided with a cover plate 134, an opening 136 being provided therein to accommodate the adjusting movements of the crank pin 112. The crank pin 112 preferably mounts an anti-friction bearing 138 which is slidably movable lengthwise within an elongate slot 140 formed in an end portion 100a of the actuator arm extending on one side of the pivot 102. The slot 140, if desired, may be covered on its exposed side by a cover plate 142 which is retained in position by means of appropriate retaining screws 144.

With the arrangement just explained, the amplitude of oscillation of the actuator arm 100 may be adjustably pre-set for the particular welding parameters required. It will be appreciated that the extent of oscillatory movement of the actuating arm portion 100a will effectively determine the oscillatory amplitude of the opposite end 100b of the actuating arm which is connected with the front cradle shoe 90. While the oscillatory movement of the torch and tip 24 may thus be effectively controlled with respect to the weld seam, it will be appreciated that it is also desirable in apparatus of the oscillatory type as embodied in the present invention, to be able to independently laterally adjust the tip 24 to correct for minor misalignments with respect to the weld seam. For such purpose, the front cradle shoe 90 is laterally slidably adjustable with respect to the actuator arm end 100b. As best shown in FIGS. 3, 5 and 6, the arm end portion 100b is forwardly extended and curved to provide an arcuate flange support for the shoe 90 which is similarly curved and positioned in sliding surface engagement with the adjacent surface of the end portion 100b. A curved guide block 145 of generally T-shaped cross-section, which is secured to the cradle shoe 90 as by retaining bolts 146, is positioned for longitudinal movement in a guide slot 148 formed in the actuator arm end portion 100b. As thus arranged, the torch is axially rotatable within the limits of the slot 148 in a manner to laterally variably position the tip 24 with respect to the weld seam.

Manually operable means are provided for varying the rotative position of the torch 20 in small controlled increments. As shown in FIG. 5, a sector gear 150 having a curvature corresponding to that of the actuator arm end portion 100b is secured as by retaining screws 152 to an adjacent face of the end portion. The sector gear meshes with an operatively associated worm 154, this worm being rotatably mounted in an extended portion of the cradle shoe 90 structure and being manually rotatable by means of a conveniently located knob 156. With this arrangement, it will be apparent that rotative movements of the knob 156 will rotate the worm 154 in a manner to cause the worm to bodily move along the sector gear 150 and thus cause sliding movement of the cradle shoe 90 in a desired direction to rotate the torch and laterally adjust the tip 24 with respect to the weld seam. These adjustments, as previously stated, are independent of the oscillatory adjustable movements of the torch tip. As shown in FIG. 3, the cradle shoe structure 90 may be provided with a front cradle curved extension 90a for engaging the neck portion 58a of the torch, this extension being secured to the shoe 90 as by suitable retaining screws 158.

The driving wheel assembly 16 is fabricated as a unit attachment to the rear support block 62 and comprises a plurality of selective driving units which are respectively arranged to accommodate the welding apparatus for different orientations of the workpieces to be welded. For example, one of the driving units is particularly adapted for use in the welding of a joint between flat surfaces in planar relation, while another driving unit will have driving wheels positioned for engaging flat surfaces of the workpieces when disposed in angularly positioned relation. Each of the driving units is arranged to drivingly interconnect with a drive pinion 160 which is fixedly mounted on an output shaft 162, as shown in FIG. 11, of the speed reducer 68 housed in the rear support block 62.

More specifically, the driving unit for traction with angularly disposed workpieces, as shown in FIGS. 10 and 11, comprises a gear box housing 164 of generally triangular configuration, and with a back wall 166 arranged for interfitting relation with the rear support block 62, the back wall having an opening 168 therein for receiving the pinion 160 into an operative meshed driving relation with a driving gear 170, when the housing 164 is mountingly secured to the rear support block as by means of retaining bolts 172.

The driving gear 170 is rotatably carried by a shaft 174 in a chamber 176 of the housing, this shaft being rotatably supported at one end in anti-friction bearings 178 in the back wall 166, and at its other end in anti-friction bearings 180 in a bearing cap 182 positioned in an access opening 184 to the chamber 176, the cap being retained by means of an appropriate retainer ring 186. As shown, the shaft 174 has a worm 188 pinned or otherwise fixedly secured for rotation with the shaft.

The worm 188 provides a common drive for the actuation of a pair of work surface engaging traction wheels 190 constructed to provide peripherally extending traction surfaces of resilient material. In some cases, the wheels may be of conventional available magnetic type in which the wheels will be magnetically adhered to the working surface. In each case, the wheels are similarly mounted and driven through a similar driving connection with the worm 188. For example, the wheel is mounted on the outermost end of a shaft 192 which is adjacently supported in an anti-friction bearing 194 in a bearing cap 196 which forms a closure for an access side opening 198 to the chamber 176, the bearing cap being retained by a conventional retainer ring 200. The other end of the shaft 192 is supported in an anti-friction bearing 202 and a worm gear 204 is pinned or otherwise fixed to the shaft. The gear 204 has meshed relation in each wheel driving connection with the common worm 188.

FIG. 12 illustrates a driving unit of modified construction which is interchangeable with the unit shown in FIG. 10, and differs primarily only in that the traction wheels 190 are axially aligned, rather than being in angled relation. In this embodiment, the housing is slightly modifed in its configuration, as shown by the numeral 164a. In this case, the pair of driving wheels is secured to a single shaft structure 208 which is supported in spaced anti-friction bearings 210 and 212, a worm gear 214 being affixed to the shaft structure and having operative meshed driving relation with the worm 188. The driving unit embodiment would be used for welding plate members with surfaces on opposite sides of the weld seam lying in substantially coplanar relation.

From the foregoing description, it will be seen that the speed of oscillation of the welding tip 24 and the propelled travel speed of the apparatus are directly intercoupled so that as the propelled speed is increased or decreased, the oscillation rate will change accordingly. A uniform weld appearance will therefore be maintained. Moreover, the utilization of separate speed reducers 66 and 68 permits a predetermined relationship between the oscillations and propelling speed to be built into the apparatus.

In the hand-held torch 20, as shown in FIG. 3, a manually operable trigger 216 is provided as a part of the torch. This trigger is so positioned that it will be moved to an activating position as shown in full lines, when the torch is gripped by the operator. Since the torch as embodied in the present apparatus may be utilized for rather long periods and in some cases may be used for automatic welding operations, provision is made for latching the trigger 216 in its activated position. As shown, latch means 218 is provided, which includes a manually swingable latching cam 220 supported on the rear support block 62 by a pivot 222 for swinging movement between non-latching and latching positions with respect to the trigger 216. By moving the latching cam 220 into a raised position, it will engage and hold the trigger 216 in its activated position.

Suitable control, not shown, are provided for controlling the direction of operation of the power means 64 so as to drive the welding apparatus in forward and reverse directions. Also provision is made for controlling the speed of the driving motor, and preferably the speed reducing means in the driving connection with the driving wheels 190 will be such that the travel rate of the apparatus may be varied from 1 to 18 inches per minute (25 to 460 millimeters per minute).

From the foregoing description, it is believed that it will be appreciated that the heretofore outlined objects of the invention will be attained, and that the apparatus embodying the described features provides inherent advantages in the carrying out of the particular types of welding operations on the associated workpieces.

Various modifications may suggest themselves to those skilled in the art without departing from the spirit of the disclosed invention, and, hence, it is not wished to be restricted to the specific forms shown or uses mentioned, except to the extent indicated in the appended claims.

We claim:

1. Welding apparatus in which a self-propelled carriage supports a welding gun of the hand-held type having a welding tip and self-contained control means for controlling feed of a welding wire to said welding tip, comprising:
   (a) an elongated rigid chassis frame structure comprising an elongate rubber tubular member having supporting wheel assemblies at its opposite ends respectively mounting a pair of wheels adapted to be positioned on opposite sides of a weld line;
   (b) power means including a motor mounted within said tubular member, said motor having a drive shaft extending longitudinally of said tubular member and a driving connection with one of said wheel assemblies to propel said carriage along said weld line;

(c) a welding gun of the self-contained hand-held type and means contacting said welding gun at spaced locations on said gun for releasably supporting said hand-held welding gun as a unit in a position extending generally above and longitudinally of said tubular member, said hand-held gun serving as a hand-grip for holding the apparatus in an operative position and moving the apparatus during a manual welding operation, said hand-held gun being supported for lateral swinging movement with its welding tip in an operating position relative to said line of weld, said means supporting the welding gun comprising a cradle pivotally mounted on said chassis frame structure for lateral swinging movements;

(d) means including the other of said wheel assemblies for guiding the carriage movement with respect to said weld line, the other one of said wheel assemblies being located beneath said tip of said welding gun and having the wheels thereof closely adjacent both sides of said weld line for accurately aligning said welding gun tip on said weld line, so that said wheel assemblies stabilize said welding gun; and (e) a driving connection between said power means and said cradle for swinging said cradle and to impact oscillatory movement of said welding tip transversely of said weld line during propelled movement of the carriage by said power means.

2. Welding apparatus according to claim 1, in which said welding tip is in an operating position outwardly spaced beyond and between the wheels of the other of said wheel assemblies.

3. Welding apparatus according to claim 1, in which the other wheel assembly includes a wheel carried by a vertically swingable support mounted on the carriage; and including adjusting means for varying the position of said support and the spacing of said tip in relation to the weld line.

4. Welding apparatus according to claim 1, in which said one of said wheel assemblies includes interchangeable wheel units respectively adapted to drivingly engage relatively planar and relatively angularly positioned surfaces along opposite sides of said weld line.

5. Welding apparatus according to claim 1, in which said cradle includes longitudinally spaced supporting shoes for respectively engaging opposite end portions of the welding gun in a manner to orient the gun in a predetermined position within the cradle.

6. Welding apparatus according to claim 5, in which one of said shoes is adapted to engage the welding gun end portion adjacent said welding tip; and which includes means for adjustably moving said shoe in a curved path, whereby to rotate the end portion of the gun supported therein and to laterally position the welding tip with respect to said weld line.

7. Welding apparatus according to claim 6, wherein the means for adjustably moving the shoe comprises a manually operable worm and associated sector gear carried by said one of said shoes.

8. Welding apparatus according to claim 1, in which the driving connection with said one of said wheel assemblies and the driving connection with said cradle, are operable by said drive shaft; and including speed changing means respectively at opposite ends of said drive shaft, said speed changing means having axially aligned input shafts and being operable to provide output speeds respectively in said driving connections, which differ from the speed of said driving shaft.

9. Welding apparatus according to claim 8, in which the speed changing means comprises separate speed reducers respectively in said driving connections; and in which the relative ratios of said speed reducers determines the speed of oscillation of said welding tip in relation to the propelled speed of said welding tip along the weld line during a welding operation.

10. Welding apparatus according to claim 1, wherein said driving connection with said cradle comprises a swingably mounted actuator arm at the front end of said carriage connected with said cradle; a longitudinally extending slot in said arm; and rotatable crank means driven by said power means including a crank pin positioned in said slot.

11. Welding apparatus according to claim 10, which includes means for adjustably varying the radius of rotation of said crank pin, whereby to change the amplitude of the swinging movement of the cradle and the width of the weld.

12. Welding apparatus according to claim 10, in which said crank means includes an independently rotatably adjustable support for said crank pin, said support having an axis of rotation offset in relation to the crank means axis of rotation, and said support being movably adjustable to move said pin in a circular path to positions wherein the axis of the crank pin is coincident with that of the axis of rotation of the crank means, and in which the crank pin is spaced at different distances from the axis of rotation of the crank means.

13. Welding apparatus according to claim 12, in which said support for the crank pin is operably connected with manually actuatable worm and gear means for adjustably rotating and selectively setting said support at the different positions of said crank pin.

14. Welding apparatus according to claim 1, in which said one of said wheel assemblies comprises a frame structure removably secured as a unit to one end of said chassis; a pair of spaced apart driving wheels respectively connected with a driving shaft means supported on said removably secured frame structure; in which said driving connection includes a worm gear mounted on said driving shaft means and an operatively associated worm having a disconnectable driving connection with said power means.

15. Welding apparatus according to claim 14, in which said wheels are rotatable with respect to a common axis.

16. Welding apparatus according to claim 14, in which said wheels are rotatable with respect to axes disposed in angular relation.

17. Welding apparatus according to claim 14, in which the driving shaft means comprises separate driving shafts respectively for said wheels; in which each of said shafts mounts a worm gear; and in which said worm is operatively associated with both of said worm gears.

18. Welding apparatus according to claim 1, which includes a fixedly positioned elongate guide member spaced from and generally paralleling said line of weld; a strut member extending between said carriage and said guide member, said strut having a connection at one end with said carriage and a movable guiding connection at its other end with said guide member; and means including said strut for continuously applying an urging force between the guide member and the carriage in a direction substantially at a right angle to the direction of movement of the carriage.

19. Welding apparatus according to claim 18, in which said strut includes connected extendable and retractable sections; and in which the urging force comprises a compression spring connected between said sections.

20. Welding apparatus according to claim 19, in which said guiding connection includes roller means carried by the strut, said roller means having rolling engagement with said guide member.

21. Welding apparatus according to claim 18, wherein said weld line and guide member are substantially vertically disposed; and which includes means at said other end of said strut for applying a generally upwardly acting weight counter-balancing force.

22. Welding apparatus according to claim 21, in which said counter-balancing force means comprises a frame supported for movement on said guide member, said frame being connected to the adjacent end of said strut; a torque motor supported on said frame; and a driving connection between said torque motor and said guide member, whereby upon energization of said motor an upwardly acting counter-balancing force will be applied to said strut.

23. Welding apparatus according to claim 1, in which the gun control means includes a manually operable trigger on the gun having "on" and "off" positions; and including means on said carriage for latching said trigger in its "on" position.

* * * * *